June 1, 1948. A. TOELLE 2,442,445
COMBINED BATTERY TERMINAL AND THERMAL REGULATOR
Filed Sept. 14, 1946

AUGUST TOELLE.
INVENTOR.

BY E. C. McRae
R. G. Harris
J. R. Faulkner
T. H. Oster
ATTORNEYS

Patented June 1, 1948

2,442,445

UNITED STATES PATENT OFFICE 2,442,445

COMBINED BATTERY TERMINAL AND THERMAL REGULATOR

August Toelle, Detroit, Mich., assignor to Ford Motor Company, Dearborn, Mich., a corporation of Delaware Application September 14, 1946, Serial No. 697,082

1 Claim. (Cl. 200—115.5)

This application is concerned with a safety device for the protection of storage batteries and more specifically with a positive or ground terminal which will protect storage batteries from excessive temperatures during the charging period. The structure described is particularly adapted to storage batteries which must function under heavy electrical loads and in high ambient temperatures. However, applicant's device is obviously applicable wherever storage batteries must be protected against the deleterious effects of charging when in an overheated condition.

Automotive batteries are usually mounted under the hood and in close proximity to the engine to make the battery accessible for servicing and incidentally to reduce the length of the cable leading from the battery to the starter. While a location near the engine is advantageous both from the service and an electrical standpoint it carries the desired disadvantage of exposing the battery to heat dissipated by the engine. In addition the battery is always subject to heat generated by heavy charging currents. It is known that operation of a battery at high temperature levels and particularly charging an overheated battery at a high rate can quickly cause irreparable damage. Applicant's invention is designed to keep the battery charging rate within safe limits with respect to the battery temperature with a minimum of disturbance to the remainder of the vehicle's electrical system and to eliminate entirely charging of overheated batteries. It is usually possible to so place an automotive storage battery with relation to the engine that engine heat alone under the most severe operating conditions likely to be encountered will not be sufficient to injure the battery. However, when the heat supplied to the battery by the engine is augmented by the internal heat due to a high charging rate, the safe operating temperature of the battery may be exceeded at a time when the battery is most vulnerable to thermal stress with concomitant rapid deterioration or failure. This combination of circumstances is particularly troublesome in busses where the large electrical load necessitates frequent cycling of the battery.

Accordingly, it is an object of this invention to protect automotive storage batteries from the effects of charging at high operating temperatures.

It is a further object of this invention to so protect storage batteries with an economical and reliable device which will cause a minimum of interference with the normal operation of the battery, generator and associated parts of the electrical system.

It is a further object of this invention to provide a thermal protective device for the battery which will function in conjunction with the voltage regulators conventionally employed in automotive practice.

It is a further object of this invention to provide a device which will preclude the possibility of a battery being subjected to charging while in an overheated condition.

With these and other objects in view, the invention consists in the arrangement, construction and combination of the various parts of the improved structure as described in the specification, claimed in the claim and illustrated in the accompanying drawings, in which:

Figure 1:
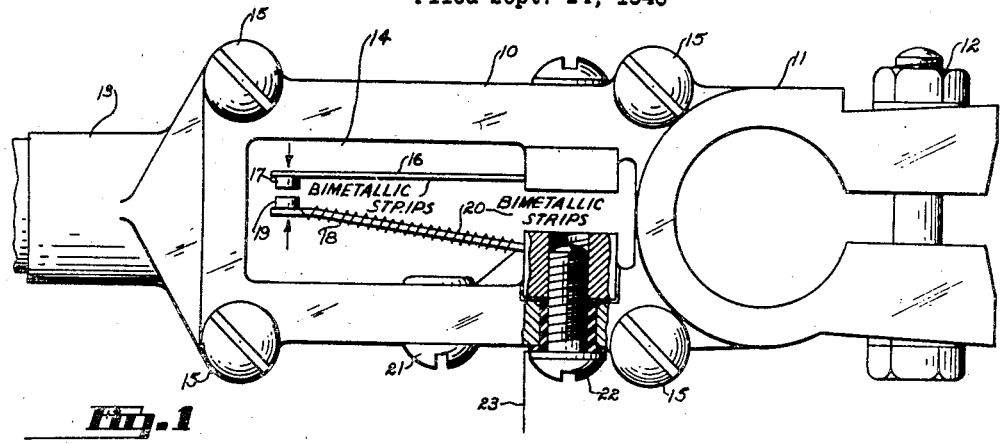
Figure 1 is a plan view, partially in section, of applicant's structure with the top cover removed. The functional parts are shown in the position assumed when the vehicle is not in operation, i. e., with the battery cold and the generator at rest.

It has been found particularly advantageous to incorporate the battery charge limiting device into the positive or grounded terminal. This battery cable terminal is preferably a bronze casting and is generally indicated at 10 (Figure 1). Bronze is preferred for this part because of its easy castability, high thermal conductivity and resistance to acid corrosion. However, any suitable metal may be used. Ground terminal 10 is provided at one end with terminal clamp 11 designed to be secured to the grounded post of the storage battery by bolt 12. At the other end of terminal 10 is provided lug 13 intended to receive the cable through which the positive terminal of the battery is grounded to the frame of the vehicle. The functional parts of the thermal limiting device are enclosed in window 14. In normal operation the functional parts would be protected by a cover secured by screws 15. However, in the drawings this cover has been removed.

Bimetallic reed 16 is solidly bolted against terminal 10 so that a good thermal and electrical contact is made. At its outer end, bimetallic reed 16 carries a contact piece 17. Bimetallic reed 18 is secured to terminal 10 by bolt 22 and is insulated therefrom electrically and thermally as shown in Figure 1. Bimetallic reed 18 is surrounded by a resistance heating element 20. This resistance heating element 20 is wound with wire of a high resistance type and is intended to act as a heating element. One end of the wire of the heating element 20 is connected to bimetallic reed 18 near contact 19 and the other end is connected by bolt 21 to terminal 10.

The output from generators in automotive vehicles is usually controlled by a voltage regulator which is basically a solenoid actuated by a shunt coil connected between the generator and ground. When the voltage of the generator exceeds a predetermined maximum the regulating solenoid is actuated and inserts a resistance in the field circuit of the generator. This of course causes the generator voltage to drop and actuates the solenoid to short-circuit the resistance out of the generator field. A rapid repetition of these two operations serves to keep the voltage of the generator constant. In prior practice the shunt coil of the voltage regulator has been grounded to the metallic base of the voltage regulator frame. In a vehicle employing applicant's invention the shunt coil of the voltage regulator is not directly grounded but the normally grounded end of said coil is connected to bolt 22 through lead 23. Thus, under normal operating conditions, the heater element on reed 18 is included in the circuit which actuates the voltage reglator.

Figure 2:
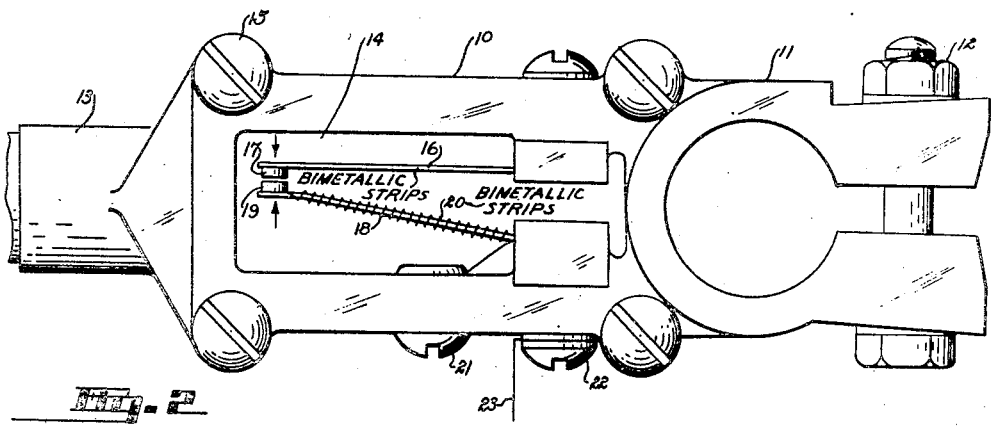
Figure 2 is a plan view similar to Figure 1 except that it depicts the functional parts in the position assumed during operation when the temperature of the battery is normal and the generator is supplying a normal charge.

With bimetallic reed 16 constructed so that a rise in temperature moves contact 17 towards contact 19 in the direction of the arrow and bimetallic reed 18 constructed so that a rise in temperature moves contact 19 toward contact 17 it is thought that the application of applicant's invention is apparent. As shown in Figure 1, the entire device is cold and the generator is inoperative. Contacts 17 and 19 are separated and as a consequence when the generator starts to operate, current through the shunt coil of the voltage regulator will flow in lead 23 into bolt 22, down bimetallic reed 18 to a spot adjacent contact 19 where it enters heating element 20 and flows through this element to ground at bolt 21. The heat generated by heating element 20 will cause bimetallic reed 18 to flex somewhat as shown in Figure 2 and cause contact 19 to approach contact 17. However, as long as the temperature of the battery remains normal, the shunt coil current is insufficient to cause contact points 17 and 19 to actually touch.

Figure 3:
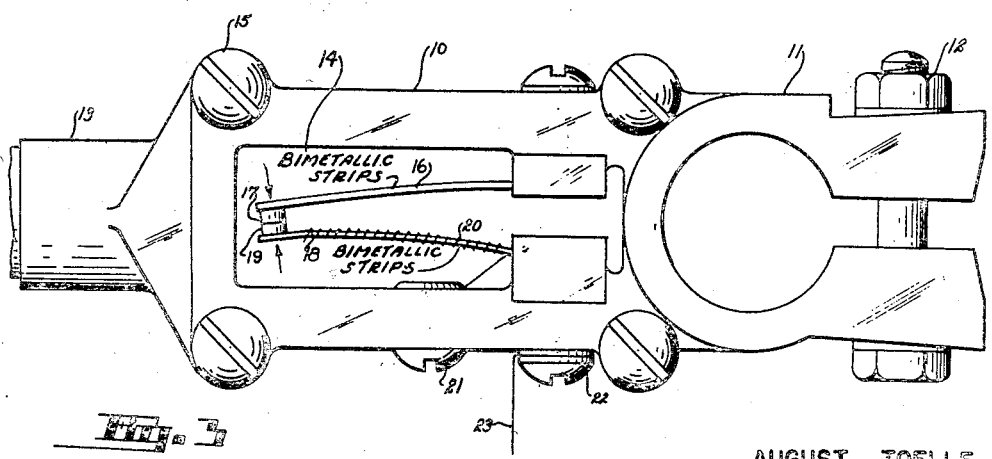
Figure 3 is a plan view similar to Figure 1 except that it depicts the functional parts in the position assumed when the temperature of the battery has exceeded a predetermined level and the charging of the battery by the generator has been stopped.

Figure 3 illustrates the action of bimetallic arms 16 and 18 when the temperature of the battery becomes abnormally high. The relatively high thermally conductive contact between the battery post and terminal 10 and bimetallic reed 16 insures that the temperature existent in the battery will be accurately mirrored in bimetallic reed 16. A dangerously high temperature in the battery will accordingly result in bimetallic reed 16 flexing as shown in Figure 3 and causing contacts 17 and 19 to touch. This short-circuits heating element 20 out of the voltage regulator shunt coil circuit and causes the voltage regulator to limit the voltage of the generator to a lower value at which charging of the battery will cease completely or drop to a negligible figure. This of course relieves the battery from any electro-chemical activity while in an overheated condition.

Short-circuiting of heating element 20 eliminates heat from this source and causes bimetallic reed 18 to tend to separate contacts 17 and 19. This action will, in the case of a marginal thermal overload on the battery, hasten the separation of contacts 17 and 19 and so cause a quick return to normal charging. This oscillating condition is brought about by the fact that resumption of charging causes heating coil 20 to become operative and also raises the temperature of the battery and terminal 10. Both of these conditions tend to reopen contacts 17 and 19.

Under even more severe thermal conditions bimetallic reed 16 will be fixed so far in the direction of bimetallic reed 18 that contacts 17 and 19 will remain closed and thus reduce the charging rate to a negligible value.

With the safeguard provided by this construction the vehicle operator is assured of maximum battery life under conditions imposed by the design of the vehicle, and in such design no provision need be made for the combined effect of high battery temperature and heavy charging current.

What is claimed is:

A battery cable terminal comprising an elongate, bimetallic thermally responsive reed, free at one end and secured to the body of the battery terminal at the other end, the free end of the reed carrying a contact piece and the secured end being insulated thermally and electrically from the body of the battery terminal, means for connecting the secured end of the reed to an external circuit, an electrical heating element surrounding the reed, said heating element making electrical contact with the reed adjacent the contact piece and having its opposite end grounded on the body of the battery terminal, a second elongate bimetallic thermally responsive reed free at one end and rigidly secured to the body of the battery terminal in good thermal and electrical contact at the other end, the first mentioned reed being arranged to move its contact piece towards the corresponding contact piece on the second reed in response to increasing current in the heating element, and the second mentioned reed being arranged to move its contact piece towards the corresponding contact piece on the first reed in response to increasing temperature in the body of the battery terminal.

AUGUST TOELLE.

REFERENCES CITED

The following references are of record in the file of this patent:

UNITED STATES PATENTS

| Number | Name | Date |
|---|---|---|
| 2,136,716 | Toelle | Nov. 15, 1938 |
| 1,507,204 | Willoughby et al. | Sept. 2, 1924 |
| 1,663,252 | Herbrick | Mar. 20, 1928 |